Patented Oct. 8, 1940

2,216,879

UNITED STATES PATENT OFFICE 2,216,879

PRODUCTION OF TITANIUM PIGMENTS

Louis C. Eckels, Baltimore, Md., assignor to E. I. du Pont de Nemours & Company, Wilmington, Del., a corporation of Delaware No Drawing. Application March 30, 1938, Serial No. 198,899

8 Claims. (Cl. 134—58)

This invention relates to the art of titanium oxide pigments. More particularly, it relates to the flocculation of deflocculated suspensions of titanium oxide pigments. Still more particularly, it relates to the manufacture of fine textured water dispersible and water wetting titanium oxide pigments.

Titanium oxide pigments are usually produced by calcination or other heat-treatment of a precipitated pigment material comprising titanium oxide. It is well known in the art that such heat-treated titanium oxide pigments contain hard gritty particles or aggregates which prevent the formation of a smooth, unbroken and glossy film of a coating composition, such as a paint, when made from such a product. This property of such pigments is a direct result of the conditions obtaining in their methods of manufacture. The precipitation step tends to form aggregates of fine particles and the subsequent treatments, such as drying and calcination, cement these aggregates by compacting and sintering.

It has been recognized in the art for a long time that titanium oxide pigments must be in a relatively finely divided condition in order to be useful in the manufacture of such commodities as paint, paper, rubber, oilcloth coatings, etc. The present tendency on the part of pigment users is to demand titanium oxide pigments which are even more finely divided than heretofore so that they can disperse these pigments in their products with less work or can improve the quality of their products with no extra work. Furthermore, finely divided titanium oxide pigments which are wet readily by water and which disperse easily in this medium are required for use in many aqueous compositions such as water paints, paper coating compositions, etc.

One commonly used method of producing finely divided calcined titanium oxide pigments is by wet milling. Substantial improvements in the art of wet milling of titanium oxide pigments are disclosed in U. S. Patent 1,937,037. This process comprises a continuous grinding and hydro-separation circuit in which the calcined titanium oxide pigments are ground and dispersed in aqueous media with the aid of a dispersing agent such as sodium hydroxide. The fines are then separated from the coarse by hydroseparation and the coarse reground. The overflow fraction, constituting a dispersed suspension of titanium oxide pigment particles having substantially a particle size of 15 microns or less is, however, unfit for use as such in paints or the like. In order to fit it for such use it is necessary that essentially all of the water and the greater part of the water soluble compounds in the suspension be removed from the titanium oxide pigment and that the dried pigment be in a relatively finely divided state. These results are usually accomplished in the case of flocculated pigment slurries by allowing the pigment to settle to form a thick slurry of the pigment and a clear water layer. The thick slurry is filtered, washed, dried and after dry milling to break up lumps formed on drying the pigment is ready for use. However, the titanium oxide pigment in the overflow fraction, obtained according to processes such as that of U. S. Patent 1,937,037, is deflocculated to such an extent that it separates into a thick slurry of the pigment and a clear water layer only on long standing. Furthermore, the pigment particles, even in this thick slurry, are in such a finely divided state that the titanium oxide pigment cannot be filtered in the equipment normally used for pigment filtration. At the beginning of the filtration operation a large part of the deflocculated titanium oxide pigment is not retained by the filter cloths but passes through with the filtrate. A certain proportion, however, of the pigment is retained in the interstices of the filter cloths which rapidly closes up said interstices of said filter cloths and prevents free passage of the filtrate or subsequent wash water through said filter cloths. Consequently, the filtration operation results in a high loss of the titanium oxide pigment in the filtrate and the formation of a thin hard cake of titanium oxide pigment on the filter cloths which cannot be washed on said filter cloths by passage of water through said cake to remove water soluble salts from the pigment.

The overflow fraction obtained according to processes such as that of U. S. Patent 1,937,037 has, according to prior art practice, been deflocculated by acidifying the suspension with a strong acid such as sulfuric acid to a pH of below 6.5, preferably to about 4. This results in the breaking of the suspension and rapid settling of the pigment to a thick slurry which may be filtered. However, the titanium oxide pigment obtained according to this process has certain definite disadvantages. For instance, a large amount of acid is required to coagulate the dispersed pigment and this results in the formation of large quantities of water soluble salts such as sodium sulfate and the like. In practice it is not economically feasible to wash the filtered pigment to remove said large quantities of soluble salts which are not removed during the subsequent drying operations and which remain associated with the pigment and which adversely affect the durability of paints and enamels prepared therefrom. A further objection to the usual prior method is that coagulation is effected at a pH of less than 6.5 and usually at a pH of about 4. This results in the formation of a pigment which is distinctly acid and therefore unsuitable for use in many paints and the like. A still further objection to the usual prior art method of coagulation is that the filtered pigment contains a relatively large amount of soluble salts, such as sodium sulfate, which, when the pigment is dried tend to cement the pigment particles together to form lumps which may only be broken down by the usual dry milling processes with difficulty, if at all, thus largely offsetting the beneficial effects of the prior wet grinding process. A still further objection to the usual prior art method of coagulation is that the finished titanium oxide pigment is not wet readily by water. It has a high water absorption and does not disperse readily in water or remain suspended in this medium. Even after vigorous agitation in water or wet milling, as in a colloid mill, the pigment particles are not dispersed but flocculate to form clusters of pigment particles which settle rapidly. The calcined titanium oxide pigment suspensions, such as the overflow fraction from processes such as that of U. S. Patent 1,937,037, are fairly satisfactory for use in water composition but their use is limited since it is not economical to transport large amounts of water from the manufacturing plant to the consumer. Furthermore, while the pigment suspensions do not settle rapidly, they do settle slowly to a thin hard cake and on long standing the settled pigment cake may only be removed from its container with the greatest of difficulty.

Titanium oxide pigment, characterized by low water absorption properties and excellent dispersion characteristics in water is prepared by dry milling calcined titanium oxide pigment. However, it is difficult to accomplish satisfactorily fine division of calcined titanium oxide pigments by dry milling. Disintegrating which is accomplished, for example, in rotary hammer mills, squirrel cage disintegrators, does not effect fine subdivision of the coarse aggregates of said pigments which are formed during the calcination. Pulverizing which is accomplished, for example, in ring roll mills, edge runner mills, pebble mills, buhrstone mills, and the like, effects finer subdivision of calcined titanium oxide pigment aggregates than does disintegrating. Calcined titanium oxide pigments are ordinarily dry milled by pulverizing and a customary means of effecting this dry milling is by use of a ring roll mill equipped with air separator. However, this relatively effective dry milling equipment does not bring about nearly such fine subdivision of the titanium oxide pigment particles as do wet milling processes such as that of U. S. Patent 1,937,037. Furthermore, I have found that such pulverizing equipment reduces the oil absorption of the titanium oxide pigment and produces a pigment material with lower hiding power in water compositions than do wet milling processes.

This invention has as an object the flocculation of deflocculated calcined titanium oxide pigments. A further object is the improvement of the flocculation of the overflow fraction obtained according to processes such as that of U. S. Patent 1,937,037. A still further object is the flocculation of the titanium oxide pigment suspension with the formation of a minimum quantity of water soluble salts. A still further object is the elimination from the coagulated, filtered titanium oxide pigment, during the drying operation, of a large part of the water soluble salts associated therewith. A still further object is to increase the ease with which the titanium oxide pigment may be dry milled after drying. A still further object is the improvement in durability of paints and enamels comprising titanium oxide pigments. A still further object is to prepare wet milled finely divided titanium oxide pigments which have greatly improved water wetting properties. A still further object is to produce wet milled finely divided titanium oxide pigments which are readily dispersible in aqueous media. Additional objects will become apparent from an examination of the following description and claims.

These objects are attained according to the herein described invention which broadly comprises adding carbon dioxide to an alkaline deflocculated suspension of a titanium oxide pigment.

In a more restricted sense this invention comprises deflocculating an aqueous suspension of a calcined titanium oxide pigment with an alkaline reacting alkali metal compound. I have found it desirable to add the deflocculating agent in an amount sufficient to produce a slurry having a pH of more than about 7.2. This deflocculated slurry is then subjected to a continuous grinding system, and thereafter the titanium oxide pigment is coagulated by the addition of carbon dioxide.

The preferred embodiment of this invention comprises deflocculating an aqueous suspension of a calcined titanium oxide pigment with an alkaline ammonium compound, preferably ammonium hydroxide. Alkaline ammonium compounds which react with carbon dioxide to form compounds which volatilize at a temperature of about 100° C. or less are the preferred class of deflocculating agents for use in my herein described invention. This deflocculated suspension is then subjected to a continuous grinding system and thereafter the titanium oxide pigment is coagulated by the addition of carbon dioxide. I have found that superior results are obtained when the carbon dioxide is bubbled into an agitated deflocculated suspension under pressure in such amounts as to reduce the pH of the suspension to between about 5 and about 7, preferably to about 6.5.

Various arrangements and selections of equipment for the operation of my process are possible. In the preferred arrangement of equipment, however, I feed an aqueous suspension of unground titanium oxide pigment, containing about 10 parts by weight of water in which is dissolved the dispersing agent or agents, to 1 part by weight of pigment, to a continuous ball or tube mill which is fed by either a tube extending into the end of the mill or by a scoop feeder. In passing through the mill the product is ground and the mill discharge is fed continuously into a hydroseparator tank. The fines are overflowed and the coarse returned to the ball mill. The overflow from the hydroseparator tank is conducted to a mechanically agitated receiving tank into which carbon dioxide is bubbled under pressure or not as is desired, to effect coagulation of the titanium oxide pigment in said overflow. The flocculated suspension is then passed to a second settling tank. The pigment settles rapidly to form a slurry containing about 2 parts water to 1 part of titanium oxide pigment. This slurry is filtered, dried at a temperature of above about 100° C., and after dry milling to break up lumps formed on drying, the pigment is ready for use.

The following examples are given for illustrative purposes and are not intended to place any restrictions on the herein described invention:

*Example I*

A closed circuit wet grinding system consisting of a ball mill feeding into a hydroseparator from which the underflow was returned to the ball mill, while the overflow was collected separately, was operated in such a manner that 600 cubic centimeters of water slurry containing 90 grams of calcined titanium dioxide and 0.16 gram of sodium hydroxide, and having a pH of 9.8, overflowed each minute. Carbon dioxide was bubbled into a mechanically agitated 4 liter sample of said overflow at the rate of 50 cubic centimeters per minute. Coagulation was effected at the end of 48 minutes of this treatment, (corresponding to the addition of 4 cubic centimeters of carbon dioxide per gram of titanium oxide) when the slurry had a pH of 7.1. The coagulated pigment slurry was filtered, dried at 150° C. and dry milled. A second sample of the above overflow was acidified with sulfuric acid to a pH of 4, according to the prior art method, to effect coagulation of the titanium dioxide. The sulfuric acid coagulated pigment was filtered, dried and dry milled as was the sample coagulated with carbon dioxide. In the following table are recorded the properties of the titanium dioxide prepared by my process and of the titanium dioxide prepared by the prior art sulfuric acid coagulation process:

| Pigment | Carbon dioxide coagulated $TiO_2$ | Sulfuric acid coagulated $TiO_2$ |
|---|---|---|
| pH | 7.6 | 5.0 |
| Soluble salt content percent | 0.07 | 0.19 |
| Texture | 14 | 12 |
| Paint grit | 13 | 9 |
| 325 mesh water grit percent | 0.15 | 5 |
| Water absorption | 60 | 400 |
| Water dispersion | 70 | 0 |

Example II

A slurry of 100 grams calcined titanium dioxide, 0.2 gram $NH_4OH$ and 200 grams water was ground for 16 hours in a pebble mill. The ground slurry, diluted to 667 cubic centimeters with water and having a pH of 9.0, was agitated mechanically while carbon dioxide was bubbled into the slurry at the rate of 50 cubic centimeters per minute. Coagulation was effected at the end of 1 hour (corresponding to the addition of 30 cubic centimeters of carbon dioxide per gram of titanium dioxide), when the pH of the slurry was 7.0. The coagulated pigment slurry was filtered, dried at 150° C., and dry milled and designated as Sample A.

A slurry containing 100 grams calcined titanium dioxide similar to that treated as above, 0.3 gram $NH_4OH$ and 200 grams water, was ground for 16 hours in a pebble mill. The ground slurry, diluted to 667 cubic centimeters with water and having a pH of 9.5, was agitated mechanically while carbon dioxide was bubbled into the slurry at the rate of 50 cubic centimeters per minute. Coagulation was effected at the end of 2 hours (corresponding to the addition of 60 cubic centimeters of carbon dioxide per gram of titanium dioxide), when the pH of the slurry was 7.0. The coagulated pigment was filtered, dried and dry milled as was the sample dispersed with 0.2 gram $NH_4OH$, and was designated as Sample B.

A slurry containing 100 grams calcined titanium dioxide similar to those treated as above, 0.18 gram sodium hydroxide and 200 grams water, was ground for 16 hours in a pebble mill. The ground slurry, diluted to 667 cubic centimeters with water and having a pH of 9.8, was acidified with sulfuric acid to a pH of 4, according to the prior art method, to effect coagulation of the titanium dioxide. The sulfuric acid coagulated pigment was filtered, dried and dry milled as were the samples coagulated with carbon dioxide, and was designated as Sample C.

In the following table are recorded the properties of the titanium dioxide Samples A and B prepared by my novel process and of the titanium dioxide Sample C prepared by the prior art sulfuric acid coagulation process:

| $TiO_2$ pigment | Sample A | Sample B | Sample C |
|---|---|---|---|
| pH | 6.8 | 6.8 | 5.0 |
| Soluble salt content percent | 0.04 | 0.05 | 0.2 |
| Texture | 16 | 15 | 11 |
| Paint grit | 16 | 14 | 8 |
| 325 mesh water grit percent | 0.10 | 0.12 | 6 |
| Water absorption | 50 | 40 | 400 |
| Water dispersion | 2.2 | 60 | 0 |

Example III

A closed circuit wet grinding system consisting of a ball mill feeding into a hydroseparator, from which the underflow was returned to the ball mill, while the overflow was collected separately, was operated in such a manner that 127 liters of water slurry containing 19 kilograms of calcined titanium oxide and 34.2 grams of sodium hydroxide and having a pH of 9.8 overflowed each minute. This dispersed slurry was agitated mechanically, and flocculated by bubbling into it carbon dioxide at the rate of 76 liters per minute, the pH attained by the mixture being 6.9. After 50,000 liters of slurry was collected, the coagulated suspended pigment was allowed to settle, the supernatant liquor decanted off, and the remaining pigment filtered, dried at 150° C. and dry milled by passage through a 24 inch rotary hammer mill at the rate of 2300 pounds per hour.

8 tons of calcined titanium dioxide similar to that introduced into the aforementioned wet grinding system was dry milled according to the prior art process for the manufacture of a water wetting and water dispersible titanium dioxide pigment by passage at the rate of 2300 pounds per hour through a 50 inch ring roll mill equipped with an air separation system.

In the following table are recorded the properties of the water wetting and water dispersible titanium dioxide prepared by my novel process and of the water wetting and water dispersible titanium dioxide prepared by the prior art dry milling process:

| Pigment | Wet milled $CO_2$ coagulated titanium dioxide | Dry milled titanium dioxide |
|---|---|---|
| Oil absorption | 23.6 | 18 |
| pH | 7.6 | 7.7 |
| Soluble salt content percent | 0.07 | 0.35 |
| Texture | 16 | 9 |
| Paint grit | 13 | 4 |
| 325 mesh water grit percent | 0.15 | 5.2 |
| Water absorption | 60 | 24.7 |
| Water dispersion | 85 | 85 |

It is to be understood that the disclosed specific embodiments of this invention may be subjected to variation and modification without departing from the scope thereof. For example, carbon dioxide instead of being used alone may be used in conjunction with the prior art coagulants such as sulfuric acid, and such an operation is considered as within the scope of this invention.

However, because of the superior results obtained, it is preferred to use the carbon dioxide alone and not in conjunction with the aforementioned prior art coagulants.

Further, it is to be understood that the deflocculating agent employed may be any one of a class of alkaline reacting alkali metal compounds, which term is intended to include ammonium compounds, or any combination of said alkali metal compounds. Sodium hydroxide, sodium carbonate, sodium silicate, sodium aluminate, trisodium phosphate, sodium metaphosphate, sodium pyrophosphate and aqua ammonia are the commonest and best available agents for use in my novel process. The amount and type of deflocculating agent required by a given titanium oxide pigment suspension can best be learned by experimental trial and the amount will vary with the previous history of the titanium oxide pigment, the type of pigment slurry desired, and the properties required in the finished titanium oxide pigment. The deflocculating agent should be added in such amount as to produce a slurry with a pH of between about 7.2 and about 10 or higher, preferably between about 8 and about 10. Alkaline ammonia compounds, such as ammonium hydroxide, which react with carbon dioxide to form compounds which volatilize at temperatures of less than about 100° C. are preferred deflocculating agents when it is desired that the finished titanium oxide pigment should have minimum soluble salt and minimum grit content. When it is desired, in a single process, to obtain a finished titanium oxide pigment which is distinctly alkaline, having a pH of about 7.5 or higher, I prefer to effect dispersion with an alkaline compound of such alkali metals as sodium, potassium, or lithium, or with combinations of such alkaline compounds.

Further, it is to be understood that the amount of carbon dioxide required to flocculate a given titanium oxide pigment suspension and the most practicable method of introducing said carbon dioxide into said pigment suspension, can best be learned by experimental trial and the amount and method of introduction will vary with the amount and type of deflocculating agent in the suspension, the previous history of the titanium oxide pigment, the type of pigment slurry desired and the properties required in the finished titanium oxide pigment. As stated above, in the preferred embodiment of my process the carbon dioxide is bubbled into the agitated deflocculated suspension under pressure in such amount as to reduce the pH of the suspension to between about 5 and about 7, preferably to about 6.5.

While my process is particularly adapted to titanium dioxide it is also applicable to composite titanium oxide pigments such as titanates and mixtures of titanium dioxide with sulfate extenders, magnesium silicates, zinc oxide or the like.

For a better understanding of the characteristics desired in titanium oxide pigments it will be necessary to explain the various terms used herein and the method of testing employed:

*Oil absorption*

Oil absorption is the amount of oil, in grams, required to wet 100 grams of pigment.

The method of testing is described on pages 540–541 of the 8th edition of "Physical and Chemical Examination of Paints, Varnishes, Lacquers and Colors," by Henry A. Gardner, January 1937.

A 5 gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

*Texture*

The values for texture are determined according to modification A of the "Krebs Texture Test for Pigments" outlined on pages 511 and 512 of the book by Henry A. Gardner cited above. This test is as follows:

Using a spatula with a flexible blade (1½ by 6½ inches), mix the pigment with a quick drying varnish of fairly good wetting properties. The amount of pigment and varnish varies with the nature of the pigment. For titanium dioxide, use about 1.5 grams of pigment and 1.8 cubic centimeters of varnish. Give the paste 50 double rubs, using strokes about 12 inches long. Collect and re-spread the paste after each 10 rubs. Make a wedge-shaped film on glass by drawing a 3½ inch doctor blade, one end of which is resting on a steel strip 0.003 inch thick, over the paint. Allow the film to dry in a dust-free atmosphere and then examine it under illumination at grazing incidence, using a high intensity microscope lamp. Grading is most conveniently done against standards and is based on the size and number of coarse particles projecting from the thin portion of the wedge film.

The value for texture thus obtained is a measure of the number of particles of the order of 10 microns. The standards which I use range from "1" at the bottom of the scale, representing a film containing a large number of 10 micron particles and with a sand-like appearance, to "17" at the top of the scale representing a film with practically no perceptible coarse particles, smooth and glasslike in appearance. The intermediate standards represent gradual and evenly spaced graduations from one extreme to the other.

*Paint grit*

The values for paint grit are determined by a convenient and practical test for the semi-quantitative determination of coarse particles which consists in mixing 200 grams of pigment with 106 grams of a quick drying varnish. The resultant paste is passed once through a roll mill with the rolls set 0.0015 inch apart. Steel strips are used for setting the mill and are withdrawn before grinding. The ground paste is reduced to paint consistency by addition of 82 grams of the varnish to 265 grams of the paste and is allowed to stand 16 hours. A uniform film of the paint is made on glass by drawing over the paint a 3½ inch doctor blade, both ends of which are resting on steel strips 0.0015 inch thick. The film is allowed to dry in a dust-free atmosphere and is then examined under illumination at grazing incidence, using a high intensity microscope lamp, and compared for film fineness and for the presence of coarse gritty aggregates against a set of arbitrary standards. The standards which I use range from "1" at the bottom of the scale, representing a film with extremely coarse particles and sand-like in appearance to "16" at the top of the scale, representing a film with practically no perceptible coarse particles, smooth and glass-like in appearance. The intermediate standards represent gradual and evenly spaced graduations from one extreme to the other.

The value for paint grit thus obtained is a measure of the number and size of particles protruding above the surface of the film, and is especially a measure of the quantity of grit particles above a size of 40 microns.

325 mesh water grit

The 325 mesh water grit content of a pigment is determined by a test in which 3 grams of pigment is agitated vigorously with 300 cubic centimeters of distilled water for 1 minute, poured on a 325 mesh sieve, washed with a very light stream of water, and the grit dried and weighed. In cases where the pigment is not water dispersing 0.5 gram sodium pyrophosphate is added to the 300 cubic centimeters of distilled water in which the pigment is agitated.

Water absorption

Water absorption is defined as the number of grams of water required per 100 grams of pigment to produce a free flowing paste. It is determined by the following procedure:

100 grams of the pigment is placed in a tin can 3¼ inches in diameter and 3½ inches high (a pint paint can with top cut off). Water is added in small proportions while stirring with a spatula having a blade 4½ inches long and ⅞ inch wide with a square cornered end. The water is added from a 50 cubic centimeter burette. The first addition of water is thoroughly worked in with the spatula. The next additions are in 5 cubic centimeter portions with stirring after each addition. When the endpoint is approached the water additions are decreased to 1 cubic centimeter portions and then to one-half cubic centimeter portions or less. Experience in the test will teach the proper amount to use for the final additions. Since variations from below 20 to above 400 have been found for various pigments, the proper number of 5 cubic centimeter portions to be added cannot be specified without knowing something concerning the history of the pigment under test. The final addition should produce a free flowing suspension which is free from lumps of pigment.

Water dispersion

Water dispersion is determined by agitating 3 grams of pigment vigorously with 300 cubic centimeters of distilled water for 3 minutes and then immediately pouring 250 cubic centimeters of the resultant pigment slurry into a 250 cubic centimeter graduated cylinder. The cylinder is allowed to stand undisturbed for 4 hours, when a 25 cubic centimeter pipette is clamped so that the tip is 30 cubic centimeters below the surface, and 25 cubic centimeters of the suspension is removed, evaporated to dryness at 110° C., cooled in a desiccator and weighed. Dispersion is calculated as follows:

$$\text{Dispersion} = \frac{\text{weight residue} \times 100}{1.25}$$

The logical explanation of the surprising results obtained by my process is apparently that the coagulant, namely carbon dioxide, reacts with the deflocculating agents to form compounds which on subsequent drying at about 100° C. or above impart water wetting rather than water repellant characteristics to the finished titanium oxide pigment. Furthermore, the aforementioned compounds are alkaline and hence impart an alkaline reaction to said finished pigment. When the deflocculating agent is ammonia the products of the reaction, such as ammonium bicarbonate and ammonium carbonate, are removed from the titanium oxide pigment during the drying operation with the resultant formation of a finished titanium oxide pigment containing a minimum quantity of water soluble salts. On the other hand, prior art coagulants, such as sulfuric acid impart an acid reaction to the pigment and result in the formation of a titanium oxide pigment which is water repellant and which contains relatively large quantities of soluble salts.

My process possesses advantages not previously combined in a single process. Furthermore, the products of my process possess advantages not previously combined in a pigment material. Coagulation of deflocculated titanium oxide pigment with carbon dioxide, according to my process, is effected at definitely lower cost than by prior art methods. Because of the fact that flocculation of the titanium oxide pigment is accomplished with a minimum quantity of coagulating agent, formation of water soluble salts is held to a minimum with consequent improvement in the durability of paints and enamels prepared from said pigment. When a deflocculating agent such as ammonium hydroxide is employed the soluble salt content of the finished titanium oxide pigment is reduced still further with consequent still greater improvement in paint and enamel durability. Furthermore, because of its lower soluble salt content the dried product of my process can be dry milled to the required fineness more easily and economically than can the products of prior art processes. Since, in producing flocculation, the carbon dioxide reacts with the deflocculating agents to form compounds which on subsequent drying are either volatilized or remain to impart an alkaline reaction to the finished pigment, it is possible in one process according to my invention to produce wet milled titanium oxide pigments of any predetermined pH in the desirable range of from about 6.8 to about 8. In addition, my process allows the production of water wetting and water dispersible titanium oxide pigments of a fineness and oil absorption heretofore unrealized.

As many apparently widely different embodiments of this invention may be made without departing from the spirit and scope thereof, it is to be understood that I do not limit myself to the specific embodiments thereof except as defined in the appended claims.

Having described the present invention the following is claimed as new and useful:

1. In the preparation of wet milled titanium oxide pigments the steps which comprise deflocculating an aqueous suspension of a calcined titanium oxide pigment by adding thereto a member selected from the group consisting of alkaline reacting alkali metal and ammonium compounds and thereafter coagulating the pigment by the addition of carbon dioxide to this suspension.

2. In the preparation of wet milled titanium oxide pigments the steps which comprise deflocculating an aqueous suspension of a calcined titanium oxide pigment by adding thereto an alkaline ammonium compound and thereafter coagulating the pigment by the addition of carbon dioxide to this suspension.

3. In the preparation of wet milled titanium oxide pigments the steps which comprise deflocculating an aqueous suspension of a calcined titanium oxide pigment by adding thereto an alkaline ammonium compound which reacts with carbon dioxide to form compounds which volatilize at less than about 100° C. and thereafter coagulating the pigment by the addition of carbon dioxide to this suspension.

4. In the preparation of wet milled titanium oxide pigments the steps which comprise deflocculating an aqueous suspension of a calcined titanium oxide pigment by adding thereto ammonium hydroxide, grinding the deflocculated suspension, and thereafter coagulating the pigment by the addition of carbon dioxide to this suspension.

5. In the preparation of wet milled titanium oxide pigments the steps which comprise deflocculating an aqueous suspension of a calcined titanium oxide pigment by adding thereto a sufficient amount of an alkaline reacting alkali metal compound so that the suspension will have a pH of more than 7.2, subjecting the deflocculated suspension to a grinding system, and thereafter coagulating the pigment by the addition of carbon dioxide to this suspension.

6. In the preparation of wet milled titanium oxide pigments the steps which comprise deflocculating an aqueous suspension of a calcined titanium oxide pigment by adding thereto a sufficient amount of an alkaline ammonium compound so that the suspension will have a pH of between about 8 and about 10, subjecting the deflocculated suspension to a continuous grinding system, and thereafter coagulating the pigment by the addition of carbon dioxide to this suspension.

7. In the preparation of wet milled titanium oxide pigments the steps which comprise deflocculating an aqueous suspension of a calcined titanium oxide pigment by adding thereto an alkaline ammonium compound which reacts with carbon dioxide to form compounds which volatilize at less than about 100° C., the amount of deflocculating agent which is added being sufficient to produce a suspension having a pH of between about 8 and about 10, subjecting the deflocculated suspension to a continuous grinding system, and thereafter coagulating the pigment by the addition of carbon dioxide to this suspension.

8. In the preparation of wet milled titanium oxide pigments the steps which comprise deflocculating an aqueous suspension of a calcined titanium oxide pigment by adding thereto ammonium hydroxide, the amount of deflocculating agent which is added being sufficient to produce a suspension having a pH of between about 8 and about 10, subjecting the deflocculated suspension to a continuous grinding system, and thereafter coagulating the pigment by the addition of carbon dioxide to this suspension, the amount of coagulating agent which is added being sufficient to reduce the pH of the suspension to below about 7.

LOUIS C. ECKELS.